(12) United States Patent
Tsubaki

(10) Patent No.: US 10,455,109 B2
(45) Date of Patent: Oct. 22, 2019

(54) IMAGE READING APPARATUS AND METHOD FOR CONTROLLING AN IMAGE READING APPARATUS

(71) Applicant: KYOCERA Document Solutions Inc., Osaka (JP)

(72) Inventor: Kazuhiro Tsubaki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/228,023

(22) Filed: Dec. 20, 2018

(65) Prior Publication Data
US 2019/0260900 A1    Aug. 22, 2019

(30) Foreign Application Priority Data
Feb. 20, 2018 (JP) ................ 2018-028119

(51) Int. Cl.
*H04N 1/12* (2006.01)
*H04N 1/00* (2006.01)
*H04N 1/401* (2006.01)

(52) U.S. Cl.
CPC ......... *H04N 1/126* (2013.01); *H04N 1/00474* (2013.01); *H04N 1/00952* (2013.01); *H04N 1/401* (2013.01)

(58) Field of Classification Search
None
See application file for complete search history.

(56) References Cited

U.S. PATENT DOCUMENTS

| | | | | |
|---|---|---|---|---|
| 5,453,850 A | * | 9/1995 | Akuzawa | H04N 1/1017 358/462 |
| 2003/0038991 A1 | * | 2/2003 | Yoshida | H04N 1/1013 358/497 |
| 2018/0254167 A1 | * | 9/2018 | Zhao | H01J 37/1475 |

FOREIGN PATENT DOCUMENTS

JP    2006-10718 A    1/2006

* cited by examiner

*Primary Examiner* — Lennin R Rodriguezgonzalez
(74) *Attorney, Agent, or Firm* — Stein IP, LLC

(57) ABSTRACT

A continuous reading mode is a mode in which reading of a document placed on a contact glass is continued and a job is started after completion of reading is accepted. In reading of the second and subsequent sheets of the document in a set reading range, a reading controller does not move the position of the reading line of an image sensor to outside the end position of the reading range in the sub-scanning direction as seen from a home position.

11 Claims, 11 Drawing Sheets

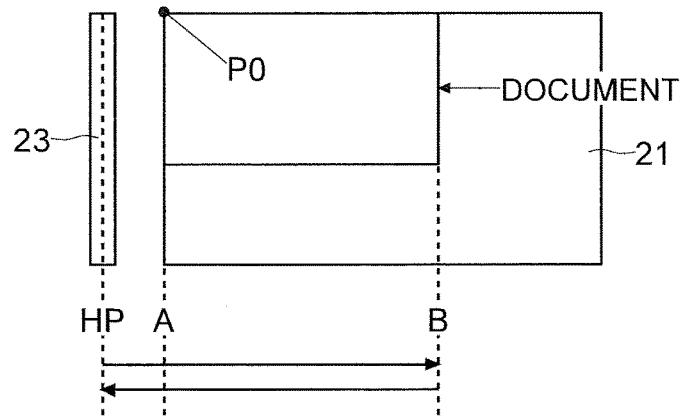

IMAGE READING APPARATUS AND METHOD FOR CONTROLLING AN IMAGE READING APPARATUS

INCORPORATION BY REFERENCE

This application is based upon and claims the benefit of priority from the corresponding Japanese Patent Application No. 2018-028119 filed on Feb. 20, 2018, the entire contents of which are incorporated herein by reference.

BACKGROUND

The present disclosure relates to an image reading apparatus that generates image data by reading a document.

The image reading apparatus reads a document with an image sensor and generates image data. The image reading apparatus is provided with a lamp irradiating a document with light. Based on the reflected light from the document, the image sensor reads the document. Some image reading apparatuses move a carriage including a lamp in the sub-scanning direction. As the carriage moves, the position irradiated with light moves in the sub-scanning direction, so that one sheet of the document is read. The carriage has a home position set for it. When a document is read, the carriage reciprocates with respect to the home position.

An image reading apparatus as described below is known. Specially, in a known image reading apparatus, an image reading portion is reciprocated in the sub-scanning direction by use of a driving source, and is arranged at the home position. When a fault occurs while the image reading portion is reading an image, the supply of power to the driving source is stopped. When a fault is resolved, the image reading portion is arranged at the home position. The image reading apparatus always tends to start image reading operation at the same position.

For example, consider a case where image data of a plurality of sheets of a document needs to be transmitted together. If a transmission job is started each time one sheet of the documents is read, setting of a transmission job needs to be repeated many times. To avoid that, an image reading apparatus may be provided with a continuous reading mode. The continuous reading mode is a mode in which a job is started after completion of reading of a plurality of sheets of a document.

As mentioned above, when the document placed on a document stage (platen) is read, the carriage may be moved in the sub-scanning direction. The movement of the carriage from the home position and the return of the carriage to the home position are repeated for each sheet of a document. In the continuous reading mode, each time a sheet of the document is read, the carriage reciprocates between the home position and an end part of the document. In this case, the movement distance of the carriage is large, and this may make it impossible to start reading of a next document immediately. A problem here is that it may take time to read a document because the movement distance of the carriage is large.

The known apparatuses mentioned above return the carriage (image reading unit) to the home position for each sheet of a document. The movement distance of the carriage can be large. Thus, they do not solve the problems mentioned above.

SUMMARY

An image reading apparatus according to one aspect of the present disclosure includes a contact glass, a carriage, an image sensor, an image data generating unit, a moving mechanism, an operation panel, and a first controller. On the contact glass, a document is placed. The carriage has a home position set for it, and includes a lamp irradiating a document with light. The image sensor receives the reflected light from a document to read the document. The image data generating unit generates image data based on the output of the image sensor. The moving mechanism moves the carriage in the sub-scanning direction at one end of the contact glass. The operation panel accepts a setting for using a continuous reading mode and settings for a start position and an end position of a reading range. The first controller controls the moving mechanism. The continuous reading mode is a mode in which, until the operation panel accepts completion of reading, reading of the document placed on the contact glass is continued, and a job is started after completion of reading is accepted. The home position is provided outside the contact glass in the sub-scanning direction. In a case where the continuous reading mode is set, and in addition the reading range is set, when the first controller reads a plurality of documents in the set reading range, in the reading of the second and subsequent sheets of the document in the set reading range, the first controller does not move the position of the reading line of the image sensor to outside the end position as seen from the home position.

Further features and advantages of the present disclosure will become apparent from the description of embodiments given below.

BRIEF DESCRIPTION OF THE DRAWINGS

FIG. 5 is a diagram showing an example of reading in a normal reading mode of the multifunction peripheral according to the embodiment;

FIG. 6 is a diagram showing an example of reading in a speed priority mode of the multifunction peripheral according to the embodiment;

DETAILED DESCRIPTION

The present disclosure relates to shortening the movement distance of a carriage including a lamp and shortening the time required in continuous reading of a document placed on a contact glass.

Hereinafter, with reference to FIGS. 1 to 16, an image reading apparatus according to an embodiment will be described. As an image reading apparatus, a multifunction peripheral 100 will be taken as an example in the following description. The multifunction peripheral 100 is capable of document reading as well as printing and transmission. The multifunction peripheral 100 also is an image forming apparatus. All the features in terms of structures and arrangements described in connection with the embodiments are merely examples for the sake of description, and are in no way meant to limit the scope of the disclosure.

(Multifunction Peripheral 100)

Figure 1:
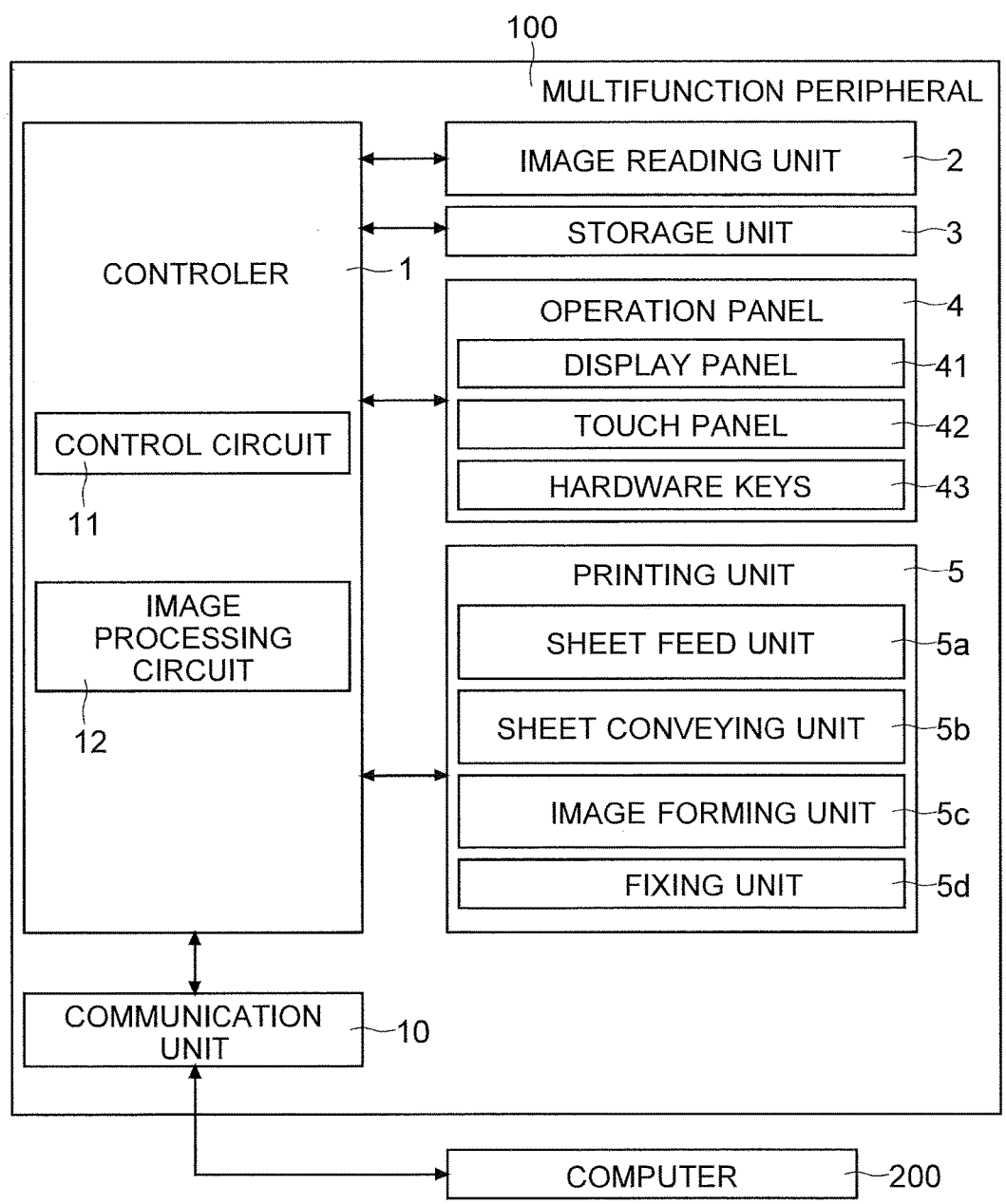
FIG. 1 is a diagram showing one example of a multifunction peripheral according to an embodiment.

With reference to FIG. 1, an example of the multifunction peripheral 100 according to the embodiment will be described. As shown in FIG. 1, the multifunction peripheral 100 includes a controller 1 (corresponding to a second controller), an image reading unit 2, a storage unit 3, an operation panel 4, a printing unit 5, and a communication unit 10. The controller 1 controls the multifunction peripheral 100. The controller 1 includes a control circuit 11 (CPU) and an image processing circuit 12. The storage unit 3 includes a nonvolatile storage device, such as ROM, flash ROM, or a storage (HDD). The storage unit 3 also includes a volatile storage device, such as RAM. The controller 1 controls different blocks by use of programs and data stored in the storage unit 3. In jobs such as copying and transmission, the controller 1 controls document reading. The controller 1 also controls printing, transmission, and storing of image data. The image processing circuit 12 performs image processing on image data.

The operation panel 4 includes a display panel 41, a touch panel 42, and hardware keys 43. The controller 1 makes the display panel 41 display setting screens and operation images. The controller 1 controls display on the display panel 41. The operation images are images of, for example, buttons, keys, and tabs. Based on the output from the touch panel 42, the controller 1 recognizes operation images which have been operated. The hardware keys 43 include a Start key and a numeric keypad. The touch panel 42 and the hardware keys 43 accept a user's operation for making settings (operation related to jobs). The controller 1 communicates with the operation panel 4. The controller 1 recognizes settings made.

The printing unit 5 includes a sheet feed unit 5a, a sheet conveying unit 5b, an image forming unit 5c, and a fixing unit 5d. In a printing job, the controller 1 makes the sheet feed unit 5a feed out a sheet. The controller 1 makes the sheet conveying unit 5b convey the sheet. The sheet conveying unit 5b discharges the printed sheet out of the apparatus. The controller 1 makes the image forming unit 5c form a toner image based on image data. The controller 1 makes the image forming unit 5c transfer the toner image to the conveyed sheet. The controller 1 makes the fixing unit 5d fix the transferred toner image to the sheet.

The communication unit 10 is communicably connected to a computer 200. The communication unit 10 and the computer 200 communicate with each other via a network. The communication unit 10 includes a communication circuit and communication software. The communication unit 10 receives printing data transmitted from the computer 200. The printing data includes data written in a page description language and setting data for printing. The controller 1 makes the printing unit 5 print based on the received printing data (a print job).

(Image Reading Unit 2)

Figure 2:
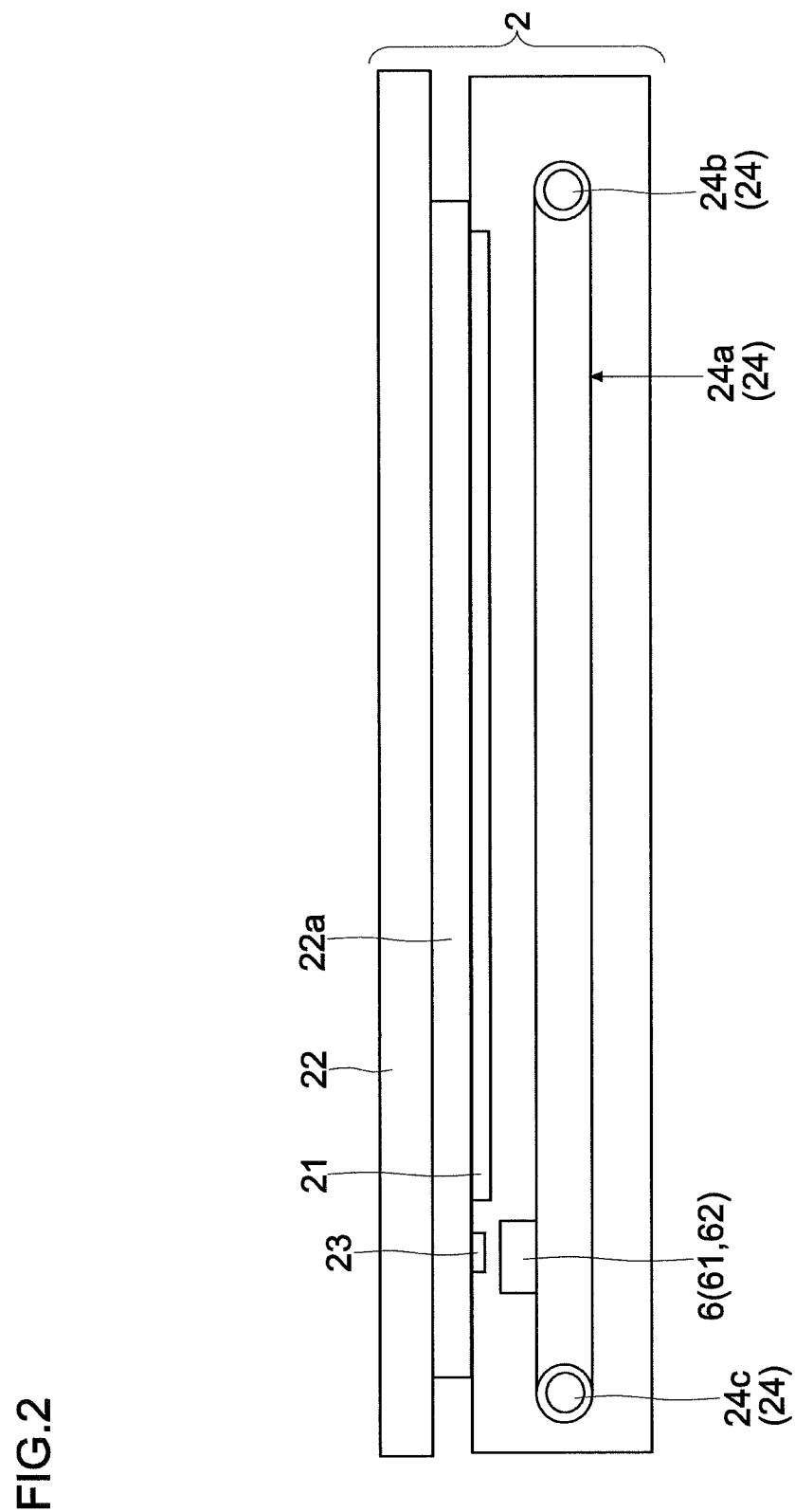
FIG. 2 is a diagram showing an example of an image reading unit according to the embodiment.

Next, with reference to FIGS. 2 and 3, the image reading unit 2 according to the embodiment will be described. FIG. 2 is a diagram of the image reading unit 2 as seen from in front. In a right side part of the top face of the image reading unit 2, a contact glass 21 (document stage) is arranged. The contact glass 21 transmits light. A document is placed on the contact glass 21. The image reading unit 2 irradiates the document placed on the contact glass 21 with light. The image reading unit 2 reads the bottom side of the document and generates image data. The controller 1 makes the storage unit 3 store the generated image data.

As shown in FIG. 2, a document pressing part 22 is arranged over the image reading unit 2. The document pressing part 22 can be opened and closed. The document pressing part 22 can be opened and closed such that a part of it on the front side of the multifunction peripheral 100 swings up and down. FIG. 2 shows a state where the document pressing part 22 is closed. On the bottom face of the document pressing part 22, a document pressing plate 22a is attached. The document pressing plate 22a is, for example, a white plate. When the document pressing part 22 is closed, the document pressing plate 22a covers the contact glass 21 from above. The document pressing plate 22a presses the document placed on the contact glass 21 from above.

Figure 3:
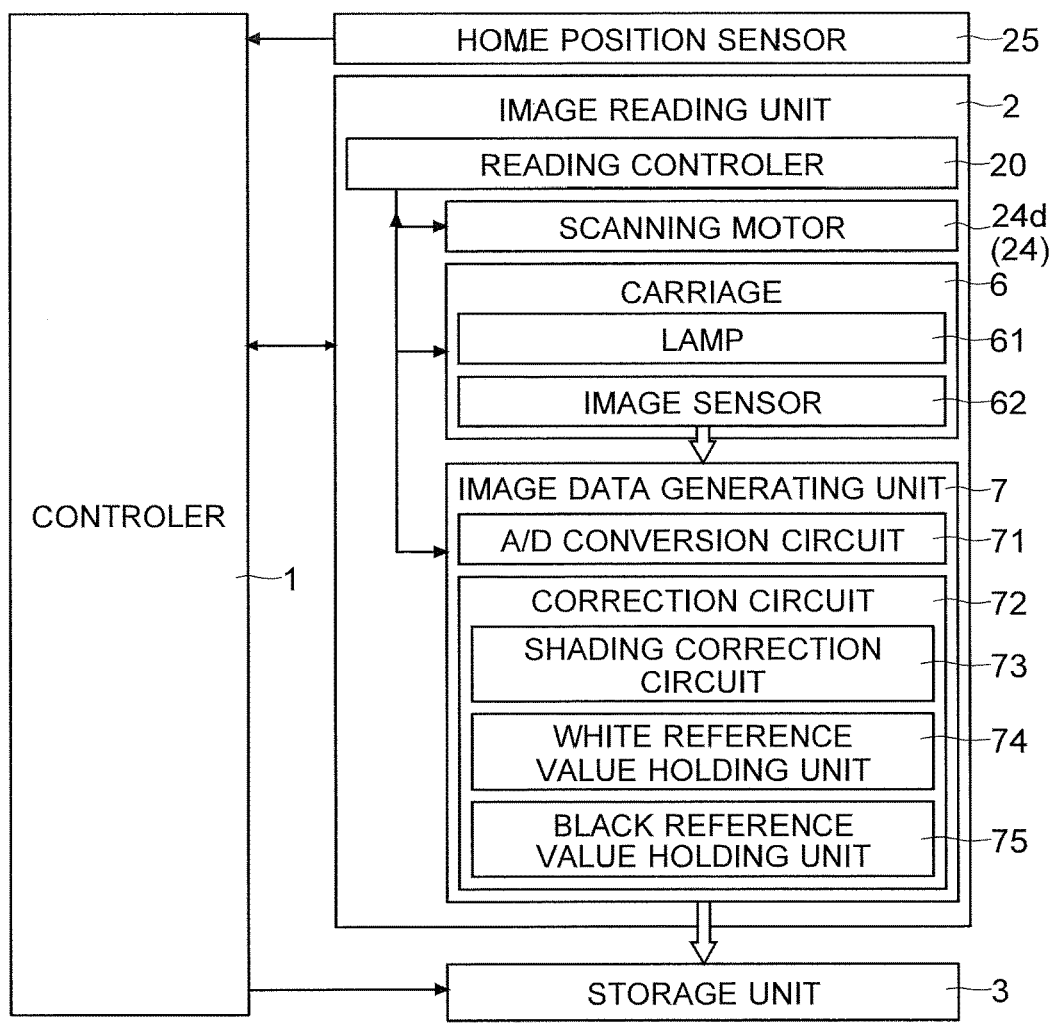
FIG. 3 is a diagram showing an example of the image reading unit according to the embodiment.

As shown in FIG. 3, the image reading unit 2 includes a reading controller 20 (corresponding to a first controller). The reading controller 20 is a circuit board which controls the operation of the image reading unit 2. The reading controller 20 includes a control circuit, a memory, and other circuits. The reading controller 20 receives instructions and signals from the controller 1 and controls document reading.

As shown in FIG. 2, the image reading unit 2 includes a carriage 6, a white reference plate 23, and a moving mechanism 24 in a housing. The moving mechanism 24 includes a belt 24a, a pulley 24b, a pulley 24c, and a scanning motor 24d. The carriage 6 is a scanning unit of a CIS type. The scanning unit may be a CCD type.

The belt 24a is endless. The belt 24a is wound around the pulley 24b and the pulley 24c. The belt 24a and the carriage 6 are connected together. The scanning motor 24d is arranged in the image reading unit 2 (see FIG. 3). The scanning motor 24d rotates the pulley 24b or the pulley 24c. The scanning motor 24d can rotate forward and backward. When the carriage 6 is moved, the reading controller 20 rotates the scanning motor 24d. Thereby, the belt 24a is rotated. As the belt 24a moves around, the carriage 6 moves together in the horizontal direction (the sub-scanning direction, the left/right direction in FIG. 2). When a document is read, the reading controller 20 moves the carriage 6 in the sub-scanning direction. The scanning motor 24d is, for example, a stepping motor. For example, as it rotates one step, the carriage 6 moves one dot (one line).

The white reference plate 23 is arranged near the contact glass 21 (at the left side in FIG. 2). The white reference plate 23 is arranged over a home position of the carriage 6. The white reference plate 23 is arranged at a position where it can be read by the carriage 6 when this is at the home position. When the carriage 6 is at the home position, the carriage 6 is at a position where it can read the white reference plate 23. The multifunction peripheral 100 includes a home position sensor 25. The home position sensor 25 changes its output level according to whether or not the carriage 6 is at the home position. The output of the home position sensor 25 is fed to the reading controller 20. Based on the output level of the home position, the reading controller 20 recognizes whether or not the carriage 6 is at the home position.

The carriage 6 includes a lamp 61 and an image sensor 62. The carriage 6 reads the document placed on the contact glass 21. The lamp 61 irradiates the document with light. The image sensor 62 includes a plurality of light receiving elements (pixels). The light-receiving elements are arrayed in the main scanning direction (the direction perpendicular to the sub-scanning direction). The image sensor 62 is, for example, a line sensor. The light reflected from the document or the document pressing plate 22a strikes the light-receiving elements. The light-receiving elements each output an analog image signal reflecting the amount of received light (the amount of reflected light). The image reading unit 2 includes an image data generating unit 7. Based on the analog image signals output from the image sensor 62, the image data generating unit 7 generates image data.

The image data generating unit 7 includes, for example, an A/D conversion circuit 71 and a correction circuit 72. The image data generating unit 7 may include an amplification circuit and an offset circuit. The amplification circuit amplifies the analog image signal. The offset circuit corrects the level of the analog image signal. The analog image signal which has undergone amplification and offset correction is fed to the A/D conversion circuit 71. The A/D conversion circuit 71 converts the analog image signal fed to it into a digital image signal. That is, the A/D conversion circuit 71 generates image data.

The generated image data is fed to the correction circuit 72. The correction circuit 72 is a circuit which corrects distortion ascribable to reading characteristics. For example, the correction circuit 72 includes a shading correction circuit 73, a white reference value holding unit 74, and a black reference value holding unit 75. The correction circuit 72 may include any other type of correction circuit.

For each light-receiving element, a white reference value and a black reference value are set. The shading correction circuit 73 performs shading correction based on the white reference value and the black reference value. The white reference value holding unit 74 holds the white reference value for each light-receiving element. The black reference value holding unit 75 holds the black reference value for each light-receiving element. The shading correction circuit 73 performs calculation for shading correction based on the black reference value and the white reference value. An example of a calculation formula for shading correction is as follows: Correction Pixel Value=(Pixel Value Before Correction−Black Reference Value)×[Maximum Pixel Value/(White Reference Value−Black Reference Value)]. The shading correction circuit 73 may perform shading correction according to any other arithmetic expression.

A white reference value is acquired by reading the white reference plate 23. With the lamp 61 lit, the white reference value holding unit 74 holds image data of a line acquired by reading the white reference plate 23. The pixel value (digital value) for each light-receiving element that is acquired by reading the white reference plate 23 is a white reference value. A black reference value is acquired based on the output of the image sensor 62 with the lamp extinguished. The black reference value holding unit 75 holds image data of a line with the lamp extinguished. The pixel value (digital value) for each light-receiving element with the lamp extinguished is a black reference value.

(Placement of a Document)

Figure 4:
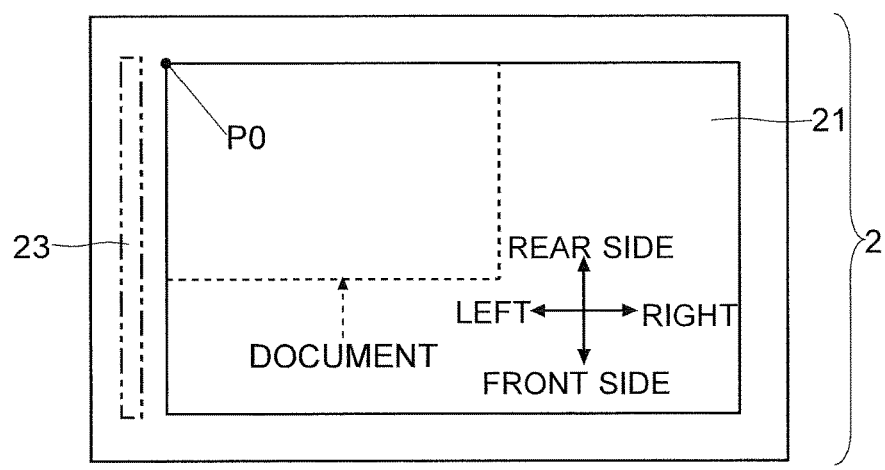
FIG. 4 is a diagram showing an example of placement of a document on a contact glass according to the embodiment.

Next, with reference to FIG. 4, an example of placement of a document on the contact glass 21 according to the embodiment will be described. FIG. 4 is a diagram of the contact glass 21 as seen from above. In FIG. 4, the document pressing part 22 is omitted from illustration for convenience. As shown in FIG. 4, a reference position P0 for placement of a document is provided. The reference position P0 is at the corner of the contact glass 21 that is located on the rear side (far side) and the left side of it. A user places a document with the to-be-read face down and the upper left corner of the document pointed at the reference position P0. To the left of a left end part of the contact glass 21 (the end nearer to the home position in the sub-scanning direction), the white reference plate 23 is arranged. The position of the head-side end of the document in the sub-scanning direction aligns with the end of the contact glass 21 nearer to the home position in the sub-scanning direction. The home position is under the white reference plate 23.

(Reading Modes)

Next, with reference to FIGS. 5 to 7, reading modes on the multifunction peripheral 100 according to the embodiment will be described. The multifunction peripheral 100 has a continuous reading mode. The operation panel 4 accepts a setting for using the continuous reading mode. The continuous reading mode is a mode in which, until the operation panel 4 accepts completion of reading (until a reading completion button B1 is operated), reading of the document placed on the contact glass 21 is repeated (see FIG. 14).

The continuous reading mode is a mode in which a job is started after completion of reading is accepted. For example, it is possible to use the continuous reading mode in a copy job and in a transmission job. When a setting for the continuous reading mode is made, whenever a reading start button B2 (see FIG. 14) displayed on the display panel 41 or a Start key (hardware key 43) is operated, the reading controller 20 performs document reading. Each time a document is read, a user places a new document to change documents.

When desired reading of a document is finished, a user performs an operation for completion of reading on the operation panel 4. For example, during the continuous reading mode, the controller 1 makes the display panel 41 display the reading completion button B1 (see FIG. 14). The operation panel 4 accepts operation of the reading completion button B1 as an instruction for completion of reading. When an instruction for completion of reading is given, in a copy job, the controller 1 makes the printing unit 5 print based on a plurality of sheets worth image data acquired by reading in the continuous reading mode; in a transmission job, the controller 1 makes the communication unit 10 transmit the plurality of sheets worth image data based on reading in the continuous reading mode.

The continuous reading mode has a plurality of reading modes; specifically, it has a normal reading mode, a speed priority mode, and an image quality priority mode. The operation panel 4 accepts the choice of a mode used in the continuous reading mode.

(Reading Operation in the Normal Reading Mode)

With reference to FIG. 5, an example of reading operation in the normal reading mode will be described. When the continuous reading mode is not used (when a job is performed by reading only a single document), reading is performed in the normal reading mode.

In FIG. 5, HP indicates the home position. In FIG. 5, A indicates the position of the head-side end of the placed document. The head-side end of the document is an end part of the document nearer to the home position in the sub-scanning direction. The head-side end of the document lies at the reference position P0 in the sub-scanning direction. The head-side end of the document aligns with the edge of the contact glass 21 nearer to the home position in the sub-scanning direction.

In FIG. 5, B indicates the position of the rear-side (rear end-side) end of the placed document. The rear-side end of the document is the edge of the document farther from the home position in the sub-scanning direction. The size of a document to be placed can be set on the operation panel 4. Based on settings on the operation panel 4, the controller 1 and the reading controller 20 can recognize the size of the placed document. In other words, the controller and the reading controller 20 can recognize the distance between A and B.

In the normal reading mode, the reading controller 20 acquires black reference values. Next, the reading controller 20 turns on the lamp 61. The reading controller 20 reads the white reference plate 23 at the home position. The reading controller 20 acquires white reference values. The reading controller 20 makes the carriage 6 start to move from the home position toward the contact glass 21 and the document. The reading controller 20 makes the scanning motor 24d start to rotate. The reading controller 20 makes the carriage 6 start to read the document from its head end (A). In other words, the reading controller 20 makes the carriage 6 start to read the document from its end nearer to the home position in the sub-scanning direction. Here, the distance (reading start distance) between the home position and the left end part of the contact glass 21 is prescribed. When the carriage 6, after starting to move, has moved over the reading start distance, the reading controller 20 makes the carriage 6 start to read.

The reading controller 20 makes the carriage 6 read the document up to its rear end (B). In other words, the reading controller 20 makes the carriage 6 read the document up to its end farther from the home position in the sub-scanning direction. Thus, the reading of one placed document is performed. After document reading, as shown in FIG. 5, the reading controller 20 returns the carriage 6 to the home position. Based on the output of the home position sensor 25, the reading controller 20 recognizes the return of the carriage 6 to the home position. Then, the reading controller 20 stops the scanning motor 24d.

(Reading Operation in the Speed Priority Mode)

Next, with reference to FIG. 6, an example of reading operation in the speed priority mode will be described. In the speed priority mode, the operation panel 4 accepts setting of a reading range 8. A user sets a start position 81 and an end position 82 of the reading range 8. The setting of the reading range 8 will be described in detail later.

In FIG. 6, HP indicates the home position. In FIG. 6, A indicates the position of the head-side end of the placed document (as in FIG. 5). In FIG. 6, B indicates the position of the rear-side end of the placed document (as in FIG. 5). In FIG. 6, C indicates the start position 81 of the set reading range 8. In FIG. 6, D indicates the end position 82 of the set reading range 8.

In the speed priority mode, how the carriage 6 is moved differs between for the first sheet of the document and for the second and subsequent sheets of the document. First, with reference to the upper part of FIG. 6, document reading of the first sheet in the set reading range 8 will be described.

First, when the reading of the first sheet of the document in the set reading range 8 is started, the reading controller 20 sets the carriage 6 at the home position. Then, the reading controller 20 acquires black reference values. Next, the reading controller 20 turns on the lamp 61. The reading controller 20 reads the white reference plate 23 at the home position. The reading controller 20 acquires white reference values. The reading controller 20 makes the carriage 6 start to move from the home position toward the document (the contact glass 21). The reading controller 20 makes the scanning motor 24d start to rotate. The reading controller 20 makes the carriage 6 start to read the document from its head end (A). In other words, the reading controller 20 makes the carriage 6 start to read the document from its end nearer to the home position in the sub-scanning direction.

The reading controller 20 makes the carriage 6 read the document up to its rear end (B). In other words, the reading controller 20 makes the carriage 6 read the document up to its end farther from the home position in the sub-scanning direction. Thus, the reading of one placed document is performed. After document reading, as shown in the upper part of FIG. 6, the reading controller 20 returns the carriage 6 to the position where the position of the reading line of the carriage 6 is at the set start position 81. When the position of the reading line is at the center of the carriage 6 in the sub-scanning direction, the reading controller 20 takes the center of the carriage 6 in the sub-scanning direction as the start position 81 (C). The reading controller 20 stops the scanning motor 24d. The reading controller 20 does not return the carriage 6 to the home position.

When the reading of the second and subsequent sheets of the document in the set reading range 8 is started, the reading controller 20 makes the scanning motor 24d start to rotate. Then, the reading controller 20 moves the position of the reading line from the start position 81 (C) to the end position 82 (D). The reading controller 20 makes the carriage 6 read only in the set reading range 8.

When the reading range 8 for the next document is the same, after document reading, the reading controller 20 returns the carriage 6 to the position where the position of the reading line of the carriage 6 is at the set start position 81 (C) (the lower part of FIG. 6). Then, the reading controller 20 stops the scanning motor 24d. The reading controller 20 does not return the carriage 6 to the home position. When a plurality of sheets of a document are read in the same reading range 8, for the second and subsequent sheets, the reading controller 20 makes the position of the reading line reciprocate between the start position 81 (C) and the end position 82 (D). The reading controller 20 makes the carriage 6 read only in the reading range 8.

(Reading Operation in the Image Quality Priority Mode)

Next, with reference to FIG. 7, an example of reading operation in the image quality priority mode will be described. Also in the image quality priority mode, the operation panel 4 accepts setting of the reading range 8. A user sets the start position 81 and the end position 82 of the reading range 8.

Figure 7:
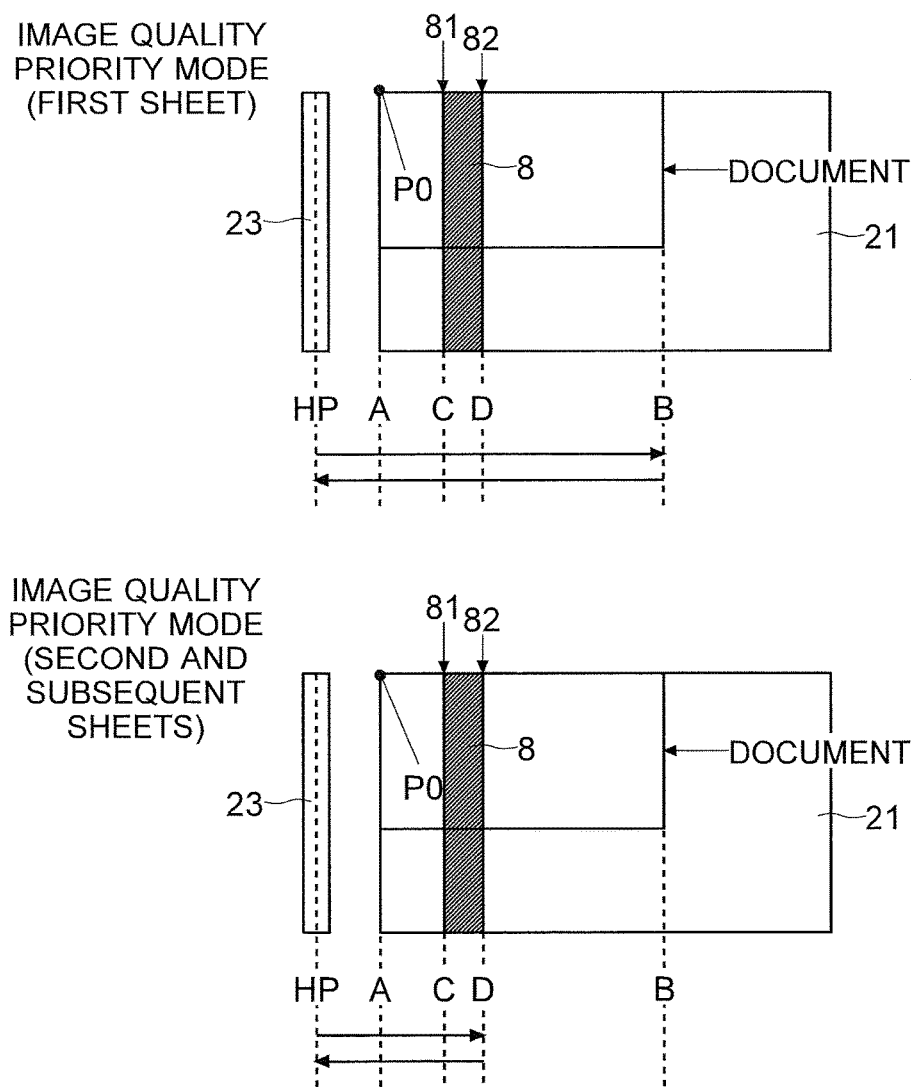
FIG. 7 is a diagram showing an example of reading in an image quality priority mode of the multifunction peripheral according to the embodiment.

In FIG. 7, HP indicates the home position. In FIG. 7, A indicates the position of the head-side end of the placed document (as in FIGS. 5 and 6). In FIG. 7, B indicates the position of the rear-side end of the placed document (as in FIGS. 5 and 6). In FIG. 7, C indicates the start position 81 of the set reading range 8. In FIG. 7, D indicates the end position 82 of the set reading range 8.

In the image quality priority mode, how the carriage 6 is moved differs between for the first sheet of the document and for the second and subsequent sheets of the document. First, with reference to the upper part of FIG. 7, document reading of the first sheet in the set reading range 8 will be described.

First, when the reading of the first sheet of the document in the set reading range 8 is started, the reading controller 20 sets the carriage 6 at the home position. Then, the reading controller 20 acquires black reference values. Next, the reading controller 20 turns on the lamp 61. The reading controller 20 reads the white reference plate 23 at the home position. The reading controller 20 acquires white reference values. The reading controller 20 makes the scanning motor 24d start to rotate. The reading controller 20 makes the carriage 6 start to move from the home position toward the document (the contact glass 21). The reading controller 20 makes the carriage 6 start to read the document from its head end (A).

The reading controller 20 moves the carriage 6 such that it reads the document up to its rear end (B). The reading controller 20 makes the carriage 6 read the document up to its rear end (B). The reading controller 20 makes the carriage 6 read the document up to its end farther from the home position in the sub-scanning direction. Thus, the reading of one placed document is performed. After document reading, as shown in the upper part of FIG. 7, the reading controller 20 returns the carriage 6 to the home position. Based on the output of the home position sensor 25, the reading controller 20 recognizes the return of the carriage 6 to the home position. Then, the reading controller 20 stops the scanning motor 24d.

When the reading of the second and subsequent sheets of the document in the set reading range 8 is started, the reading controller 20 acquires black reference values. Next, the reading controller 20 turns on the lamp 61. The reading controller 20 reads the white reference plate 23 at the home position. The reading controller 20 acquires white reference values. In the image quality priority mode, each time a document is read, the reading controller 20 updates black reference values and white reference values. Then, the reading controller 20 makes the scanning motor 24d start to rotate. The reading controller 20 makes the carriage 6 start to move from the home position toward the document (the contact glass 21).

Then, the reading controller 20 moves the carriage 6 from the home position to the position where the position of the reading line is at the set end position 82 (D). The reading controller 20 makes the carriage 6 read only in the set reading range 8. When the reading range 8 for the next document is the same, after document reading, as shown in the lower part of FIG. 7, the reading controller 20 returns the carriage 6 to the home position. Then, the reading controller 20 stops the scanning motor 24d. When a plurality of sheets of a document are read in the same reading range 8, for the second and subsequent sheets, the reading controller 20 makes the position of the carriage 6 reciprocate between the home position and the position where the position of the reading line is at the set end position 82 (D). The reading controller 20 makes the carriage 6 read only in the reading range 8.

(Setting of the Reading Range 8)

Next, with reference to FIGS. 8 to 12, an example of setting of the reading range 8 in the speed priority mode and in the image quality priority mode according to the embodiment will be described. The procedure in FIG. 8 starts when the operation panel 4 accepts an operation for using the speed priority mode or the image quality priority mode out of the different modes of the continuous reading mode.

Figure 9:
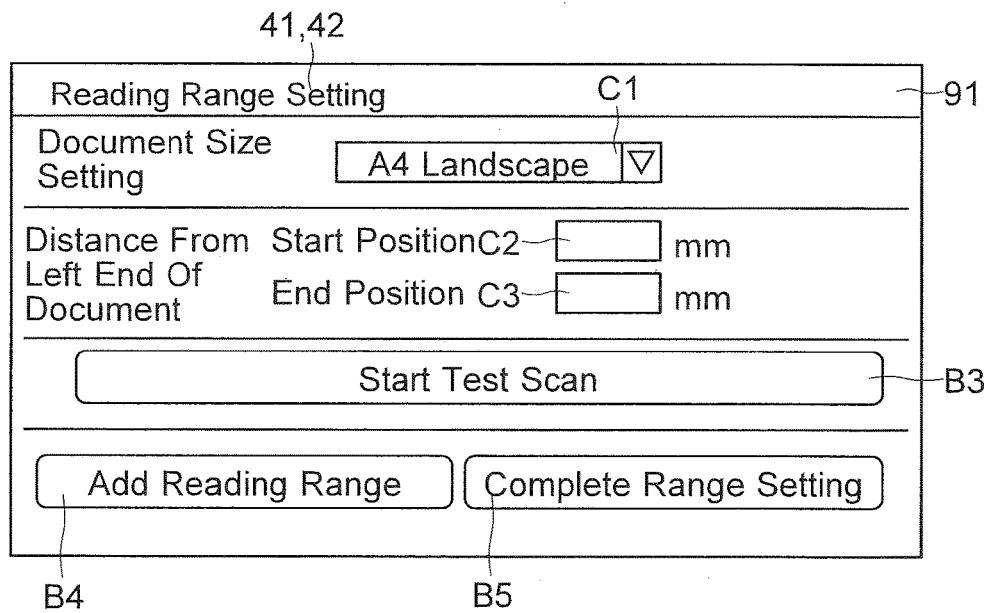
FIG. 9 is a diagram showing an example of a reading range setting screen according to the embodiment.

The operation panel 4 accepts setting of the reading range 8 (Step #11). To accept setting of the reading range 8, the controller 1 makes the display panel 41 display a reading range setting screen 91. FIG. 9 shows an example of the reading range setting screen 91. The reading range setting screen 91 includes a document size setting field C1, a start position input field C2, an end position input field C3, a test scanning button B3, a reading range addition button B4, and a range setting completion button B5.

The document size setting field C1 is a field for setting the size and orientation of a document to be read. When the document size setting field C1 is operated, the controller 1 makes the display panel 41 display a pull-down menu. The pull-down menu includes selectable combinations document sizes and document set orientations. For example, menus are displayed such as A4 size (portrait), A4 size (landscape), letter size (portrait), and letter size (landscape). The operation panel 4 accepts the choice of a size and an orientation of the document to be set from these menus.

The start position input field C2 and the end position input field C3 are fields for numerically entering the start position 81 and the end position 82. When the start position input field C2 and the end position input field C3 are operated, the controller 1 makes the display panel 41 display a software keyboard. A user can set the start position 81 and the end position 82 by use of the software keyboard. To set the start position 81, a user enters the length (distance) from the reference position P0 (the left end of the contact glass 21, the head end of the document in the sub-scanning direction) to the start position 81 in the sub-scanning direction. The start position 81 does not need to include a left end part of the contact glass 21 (the end nearer to the home position in the sub-scanning direction).

To set the end position 82, a user enters the length (distance) from the reference position P0 (the left end of the contact glass 21, the head end of the document in the sub-scanning direction) to the end position 82 in the sub-scanning direction. For example, a user enters a value based on the result of measuring the document with a ruler. The reading controller 20 recognizes the start position 81 and the end position 82 of the reading range 8 based on the entered value.

Figure 10:
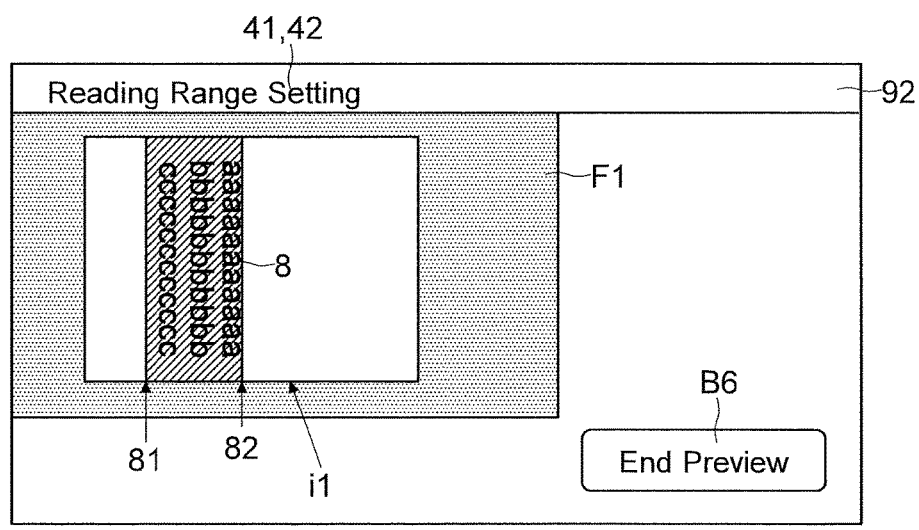
FIG. 10 is a diagram showing an example of a test scan result screen according to the embodiment.

It is possible to check whether the reading range 8 is appropriate or not by reading a document in a tentative way. A user places a sheet of a document to be read in the set reading range 8 on the contact glass 21. When the test scanning button B3 is operated, the reading controller 20 moves the carriage 6 and makes it read the document only in the set reading range 8. Then, the controller 1 makes the display panel 41 display a test scan result screen 92. FIG. 10 shows an example of the test scan result screen 92.

The test scan result screen 92 includes a preview display region F1 and a preview end button B6. In the preview display region F1, a preview image i1 showing the result of reading only in the set reading range 8 is displayed. The reading controller 20 generates the preview image i1. The preview image i1 includes a frame line indicating the whole document. In the preview image i1, the result of reading only in the reading range 8 set within the frame line is embedded. It is possible to check whether setting of the reading range 8 is appropriate or not based on the preview image i1. If it is inappropriate, a user adjusts the values of the start position 81 and the end position 82. When the preview end button B6 is operated, the reading controller 20 makes the display panel 41 redisplay (return to) the reading range setting screen 91 where the test scanning button B3 was operated.

Here, the reading range 8 can be set outside the center of the document in the sub-scanning direction as seen from the home position (the head end of the document). In this case, if the document set orientation is turned by 180 degrees, the distance from the home position (the reference position P0, the left end of the contact glass 21, the end of the contact glass 21 nearer to the home position in the sub-scanning direction, the head end of the document in the sub-scanning direction) to the start position 81 is shortened. That is, turning the document set orientation by 180 degrees makes it possible to shorten the movement distance of the carriage 6 during reading.

Figure 11:
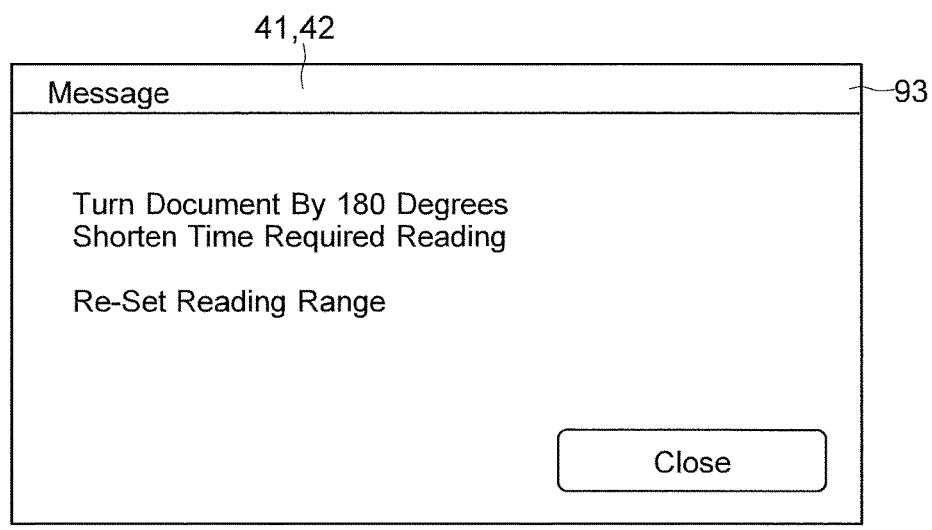
FIG. 11 is a diagram showing an example of a message display screen according to the embodiment.

The controller 1 checks whether or not the start position 81 of the set reading range 8 is located outside the center of the document in the sub-scanning direction as seen from the home position. When the set start position 81 is located outside the center of the document in the sub-scanning direction as seen from the home position, the controller 1 can make the display panel 41 display a message that the document has to be turned by 180 degrees. This makes it possible to notify a user to shorten the movement distance of the carriage 6. FIG. 11 shows an example of a message display screen 93. In this case, a user can correct the reading range 8.

Operating the reading range addition button B4 makes it possible to set another reading range 8. When the reading range addition button B4 is operated, the controller 1 makes the storage unit 3 store the set reading range 8. Then, the controller 1 makes the display panel 41 display the reading range setting screen 91 with no values entered in the document size setting field C1, the start position input field C2, and the end position input field C3. In other words, a new reading range setting screen 91 is displayed. Thus, the operation panel 4 accepts setting of a plurality of kinds of reading range 8.

A user operates the range setting completion button B5 to end setting of the reading range 8. The operation panel 4 accepts completion of setting of the reading range 8. A user can set a plurality of reading ranges 8 until operating the range setting completion button B5. Thus, setting of the reading range 8 is completed (Step #12). When the range setting completion button B5 is operated, the controller 1 makes the display panel 41 display an order setting screen 94.

Figure 12:
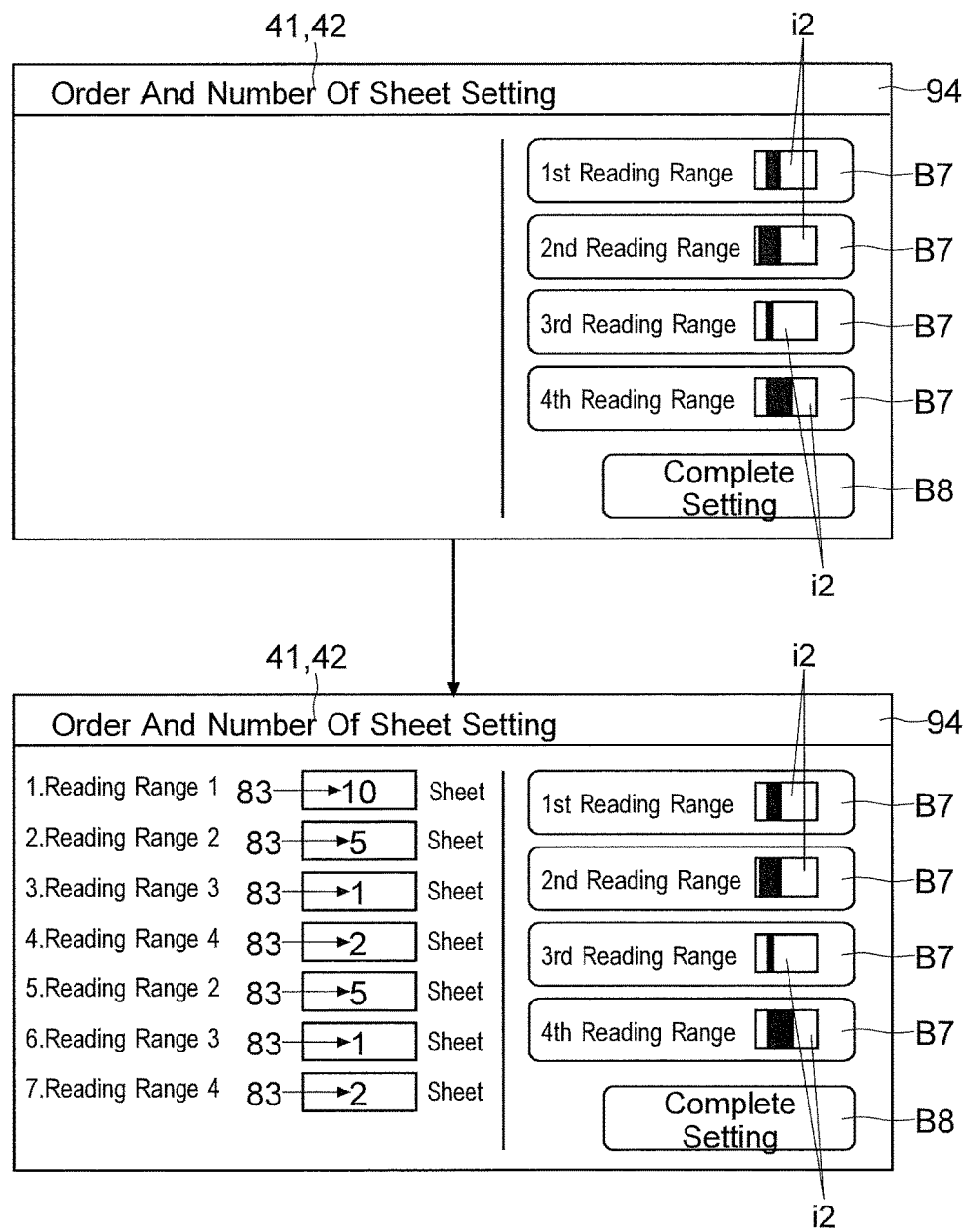
FIG. 12 is a diagram showing an example of an order setting screen according to the embodiment.

Next, the operation panel 4 accepts setting of the using order of the reading ranges 8 and the number of sheets of a document to be read in each reading range 8 (Step #13). To accept setting of the using order of the reading ranges 8 and the number of sheets of a document to be read in each reading range 8, the controller 1 makes the display panel 41 display the reading range setting screen 91. FIG. 12 shows an example of the order setting screen 94.

The order setting screen 94 includes a reading range button B7 and a setting completion button B8. When a plurality of reading ranges 8 are set, the controller 1 makes the display panel 41 display a plurality of reading range buttons B7. In FIG. 12, a case where four reading ranges 8 are set is shown. The operation panel 4 can be configured to allow setting of four or more reading ranges 8. The reading range button B7 with an indication "1st Reading Range" corresponds to the reading range 8 set first. The reading range button B7 with an indication "2nd Reading Range" corresponds to the reading range 8 set second. The reading range button B7 with an indication "3rd Reading Range" corresponds to the reading range 8 set third. The reading range button B7 with an indication "4th Reading Range" corresponds to the reading range 8 set fourth.

Each reading range button B7 includes a range display image i2. The range display image i2 is a diagram showing the set reading range 8 schematically. The controller 1 generates the range display image i2. The controller 1 fills the reading range 8 (between the start position 81 and the end position 82). For example, the controller 1 generates blank image data of the document size corresponding to the reading range 8. The controller 1 recognizes a line along the main scanning direction passing through pixels corresponding to the start position 81 and a line along the main scanning direction passing through pixels corresponding to the end position 82 out of blank image data. The controller 1 turns the pixels between the lines along the scanning direction black. Then, the controller 1 reduces image data and generates the range display image i2. The range display image i2 makes it easy to grasp which reading range button B7 corresponds to which reading range 8.

Operating the reading range button B7 makes it possible to determine the order of the reading range 8 to be applied. A lower part of FIG. 12 shows a state where the using order of the reading range 8 is determined from the first to the seventh by operating the reading range button B7 seven times. For example, the upper limit value of the using order can be set to be ten and several to several tens. When a plurality of reading ranges 8 are set, the operation panel 4 accepts setting of the using order of the reading ranges 8. Also, it is possible to set the number of sheets of a document to be read for each reading range 8 to be used. Moreover, an input field for the number of sheets to be read 83 is provided for each chosen reading range 8. When the input field of the number of sheets to be read 83 is operated, the controller 1 makes the display panel 41 display a software keyboard. The operation panel 4 accepts setting of the number of sheets to be read 83 (the number of sheets of a document) for each reading range 8.

For example, consider a case where a plurality of bundles of survey forms need to be read continuously. The kind of survey form is different from bundle to bundle, and thus the range which needs to be read may be different from one bundle of survey form to another. In this case, a plurality of reading ranges 8 are set. Then, the number of sheets of each bundle is set. Accordingly, it is possible to read a plurality of bundles of documents through a single session in the continuous reading mode while the reading range 8 is switched freely.

For another example, consider a case where a bundle of documents includes a plurality of kinds of survey form. The range which needs to be read may be different from one kind of survey form to another. Even in this case, during the continuous reading mode, it is possible to flexibly change the set reading range 8. Also, it is possible to set the number of sheets to be read in each reading range 8.

It is possible to previously program the reading range 8 to be applied and the number of sheets to be read 83 in each reading range 8. Thus, a user does not need to perform complicated operation to change the reading range 8 for each sheet of a document during reading in the continuous reading mode. During the continuous reading mode, a user can concentrate on operation to change documents. If one reading range 8 is set, the controller 1 can make the display panel 41 display only the input field of the number of sheets to be read 83. The operation panel 4 accepts input of the number of sheets to be read 83.

A user operates the setting completion button B8 to end setting of the using order of the reading ranges 8 and the number of sheets to be read 83 in each reading range 8. The operation panel 4 accepts completion of setting. Thus, setting of the using order of the reading ranges 8 and the number of sheets to be read 83 in each reading range 8 are completed (Step #14). Now that setting of the speed priority mode or the image quality priority mode is completed, the procedure ends (END).

(Continuous Reading in the Speed Priority Mode or in the Image Quality Priority Mode)

Figure 8:
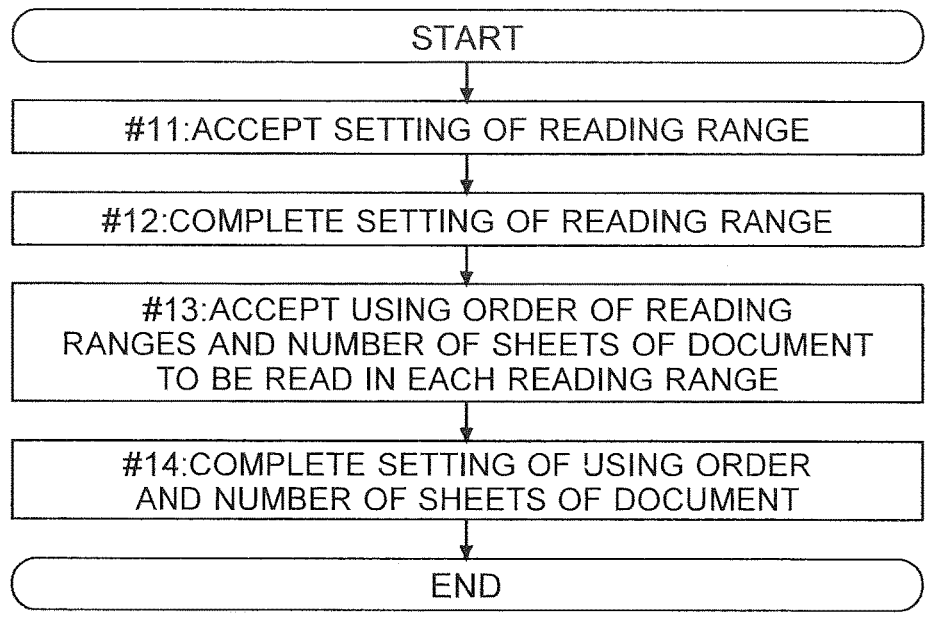
FIG. 8 is a diagram showing an example of a procedure for setting a reading range according to the embodiment.
Figure 13:
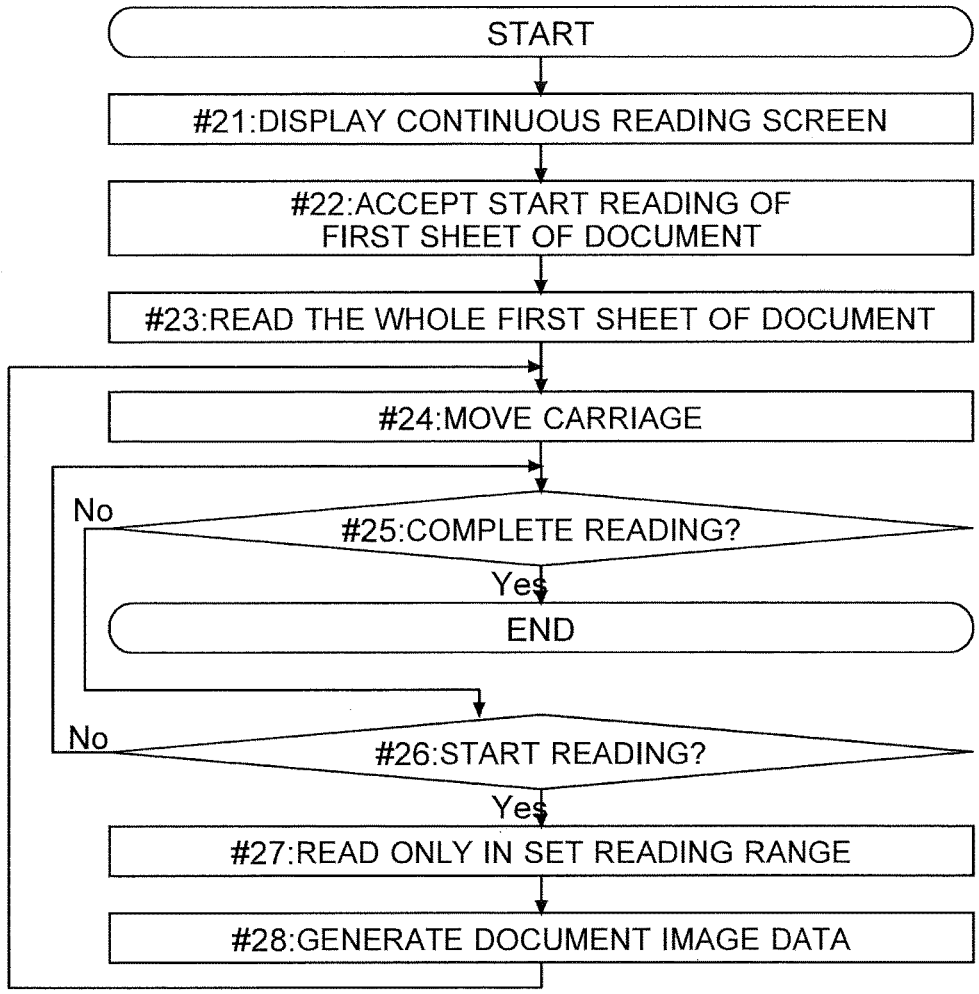
FIG. 13 is a diagram showing an example of a procedure for reading in the speed priority mode or the image quality priority mode of the multifunction peripheral according to the embodiment.

Next, with reference to FIGS. 13 to 15, an example of reading in the speed priority mode or in the image quality priority mode on the multifunction peripheral 100 according to the embodiment will be described. First, with reference to FIG. 13, an example of the procedure for reading when one reading range 8 is set will be described. The procedure in FIG. 13 starts when setting of the speed priority mode or the image quality priority mode is completed (when the procedure of FIG. 8 is ended).

First, the controller 1 makes the display panel 41 display a continuous reading screen 95 (Step #21). FIG. 14 shows an example of the continuous reading screen 95. As shown in FIG. 14, the continuous reading screen 95 includes a reading start button B2 and a reading completion button B1. When placement of a document is completed, a user operates the reading start button B2. A user operates the reading completion button B1 to end reading (to end the continuous reading mode). The controller 1 makes the display panel 41 display, under the reading start button B2 on the display panel 41, the number of sheets of a read document. FIG. 14 shows an example of the continuous reading screen 95 as it is when five documents have been read. The controller 1 makes the display panel 41 display the continuous reading screen 95 while documents are read in the continuous reading mode.

The operation panel 4 accepts starting of reading of the first sheet of the document (Step #22). In other words, the operation panel 4 accepts operation of the reading start button B2. The reading controller 20 makes the carriage 6 read the whole first sheet of the document (Step #23). Here, the reading controller 20 makes the image sensor 62 acquire black reference values and white reference values. Then, the reading controller 20 makes the scanning motor 24*d* operate. The reading controller 20 moves the position of the reading line from the home position to the rear end of the document. The reading controller 20 makes the carriage 6 read the document from its head end to its rear end. Based on what is read, the reading controller 20 makes the image data generating unit 7 generate image data of the whole first sheet of the document. Then, the storage unit 3 stores image data of the whole first sheet of the document.

Then, the reading controller 20 moves the carriage 6 (Step #24). In the speed priority mode, after completion of reading of a document, the reading controller 20 moves the carriage 6 such that the position of the reading line is at the start position 81 of the set reading range 8. In the image quality priority mode, the reading controller 20 returns the carriage 6 to the home position.

The controller 1 determines whether or not reading is completed (Step #25); specially, it checks whether or not the operation panel 4 has accepted operation of the reading completion button B1. When the operation panel 4 accepts operation of the reading completion button B1, the controller 1 determines that reading is completed. When the controller 1 determines that reading is completed (Step #25, Yes), the procedure ends (END). After completion of the procedure, the controller 1 performs a print or transmission job based on image data acquired by reading. In the speed priority mode, the reading controller 20 makes the scanning motor 24*d* operate and returns the carriage 6 to the home position.

When the controller 1 can not determine that reading is completed (Step #25, No), it determines whether or not to start the reading of the second and subsequent sheets of the document (Step #26). Specially, the controller 1 checks whether or not the operation panel 4 has accepted operation of the reading completion button B1. When the controller 1 can not determine that reading is started (Step #26, No), the procedure returns to Step #25. When the controller 1 determines that reading is started (Step #25, No), the reading controller 20 makes the carriage 6 read the second and subsequent sheets of the document only in the set reading range 8 (Step #27).

In the speed priority mode, the reading controller 20 moves the position of the reading line from the start position 81 to the end position 82, and thereby the reading controller 20 makes the image sensor 62 read only in the reading range 8. In the image quality priority mode, the reading controller 20 makes the image sensor 62 acquire black reference values and white reference values. Then, the reading controller 20 makes the scanning motor 24*d* operate. The reading controller 20 moves the position of the reading line from a position where the white reference plate 23 is read (home position) to the end position 82, and thereby the reading controller 20 makes the image sensor 62 read only in the reading range 8.

The controller 1 (image processing circuit 12) generates image data of the second sheet of the document based on the result of reading (Step #28); specially, it generates image data of the second and subsequent sheets of the document by use of image data of the whole first sheet of the document. First, the controller 1 (image processing circuit 12) copies the whole image data acquired by reading the first sheet of the document. Then, the controller 1 (image processing circuit 12) embeds, in the copied image data, the image data acquired by reading only in the reading range 8. The controller 1 (image processing circuit 12) overwrites the image data in a belt-shaped part, from the start position 81 to the end position 82, of the copied image data with the image data acquired by reading only in the reading range 8. Accordingly, even if image data is read only in the reading range 8, it is possible to acquire the whole-page image data of the second and subsequent sheets of the document. Then, the procedure returns to Step #24.

The controller 1 (image processing circuit 12) may generates image data that includes, within a page, only the image data of the read range as the image data of the second and subsequent sheets of each document.

Next, with reference to FIG. 15, an example of the procedure for reading when a plurality of reading ranges 8 are set will be described. The procedure in FIG. 15 starts when setting of the speed priority mode or the image quality priority mode is completed (when the procedure of FIG. 8 is ended).

Figure 14:
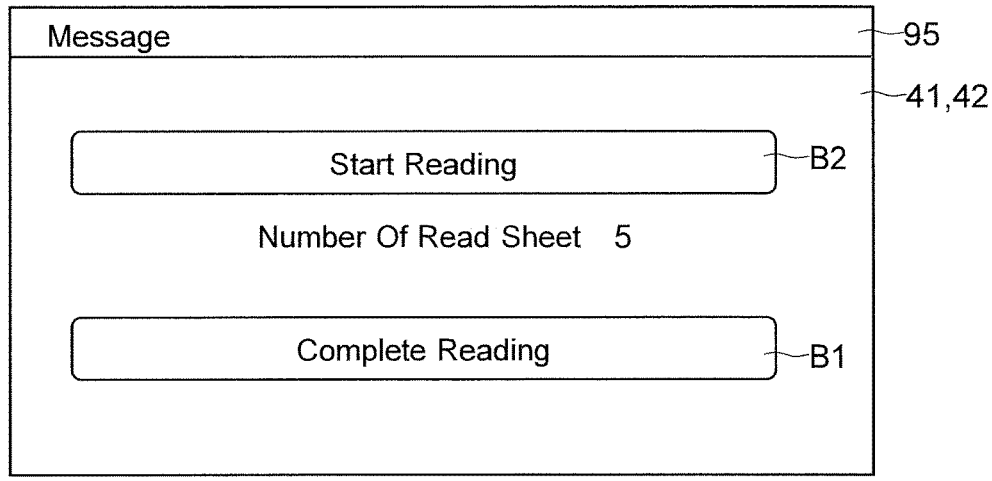
FIG. 14 is a diagram showing an example of a continuous reading screen according to the embodiment.
Figure 15:
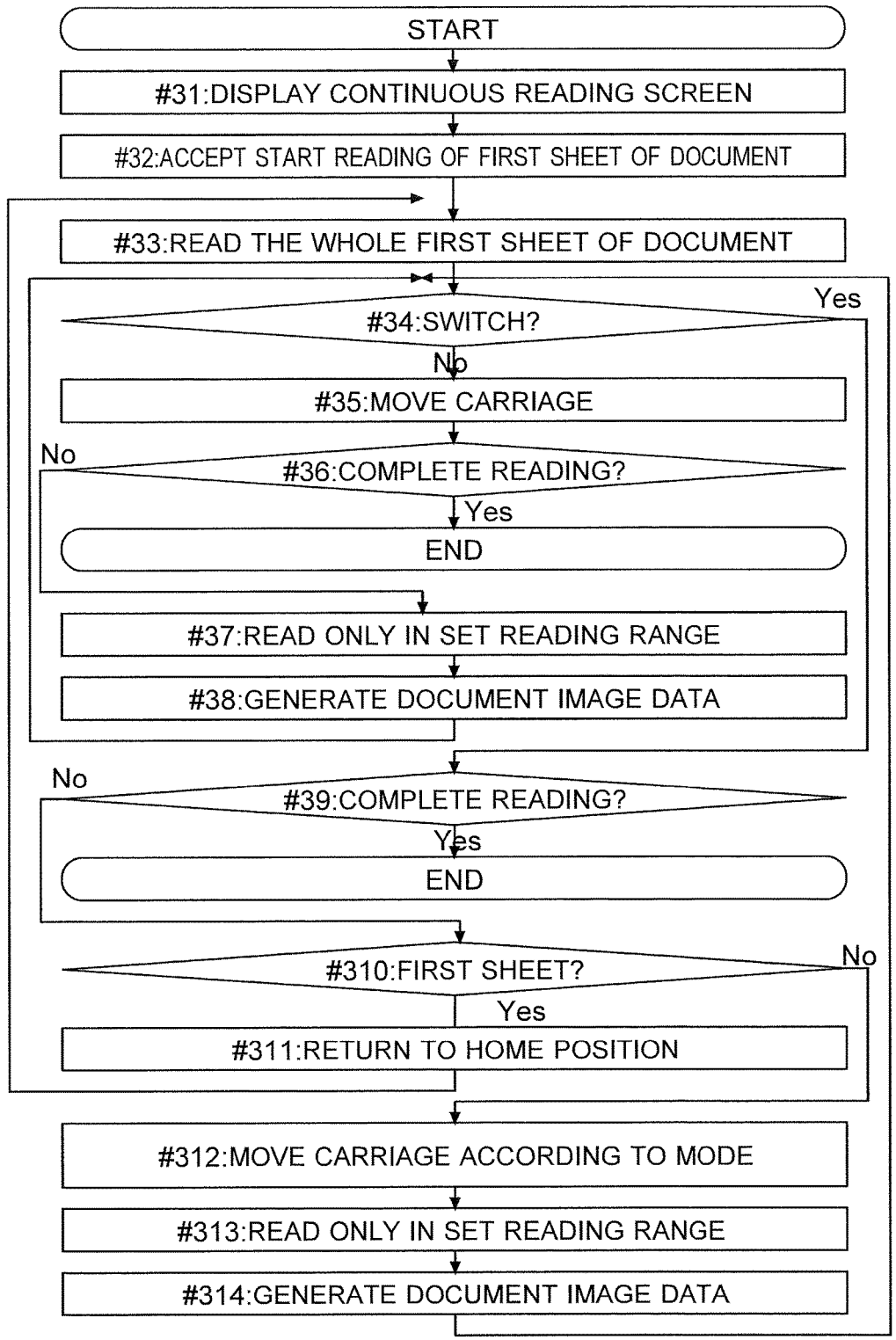
FIG. 15 is a diagram showing an example of a procedure for reading in the speed priority mode or the image quality priority mode of the multifunction peripheral according to the embodiment.

First, the controller 1 makes the display panel 41 display the continuous reading screen 95 (Step #31, FIG. 14). Next, the operation panel 4 accepts starting of reading of the first sheet of the document (Step #32). In other words, the operation panel 4 accepts operation of the reading start button B2. The reading controller 20 makes the carriage 6 read the whole first sheet of the document (Step #33). Here, the reading controller 20 makes the image sensor 62 acquire black reference values and white reference values. Then, the reading controller 20 makes the scanning motor 24*d* operate. The reading controller 20 moves the position of the reading line from the home position to the rear end of the document. The reading controller 20 makes the carriage 6 read the document from its head end to its rear end. Based on what is read, the reading controller 20 makes the image data generating unit 7 generate image data of the whole first sheet of the document. Then, the storage unit 3 stores image data of the whole first sheet of the document.

Next, the reading controller 20 checks whether or not to switch the reading range 8 (Step #34). When the set number of sheets to be read 83 is read in the present reading range 8, the reading controller 20 determines to switch the reading range 8 to the next one in order. In this case, the reading range 8 is automatically switched to the next reading range 8 in order. For example, in a case where the number of sheets to be read 83 in the first reading range 8 is set to be five, when five sheets are read in the first reading range 8, the reading controller 20 determines to switch to the second reading range 8. On the other hand, when the set number of sheets to be read 83 is not read in the present reading range 8, the reading controller 20 determines not to switch the reading range 8 to the next one in order.

Figure 16:
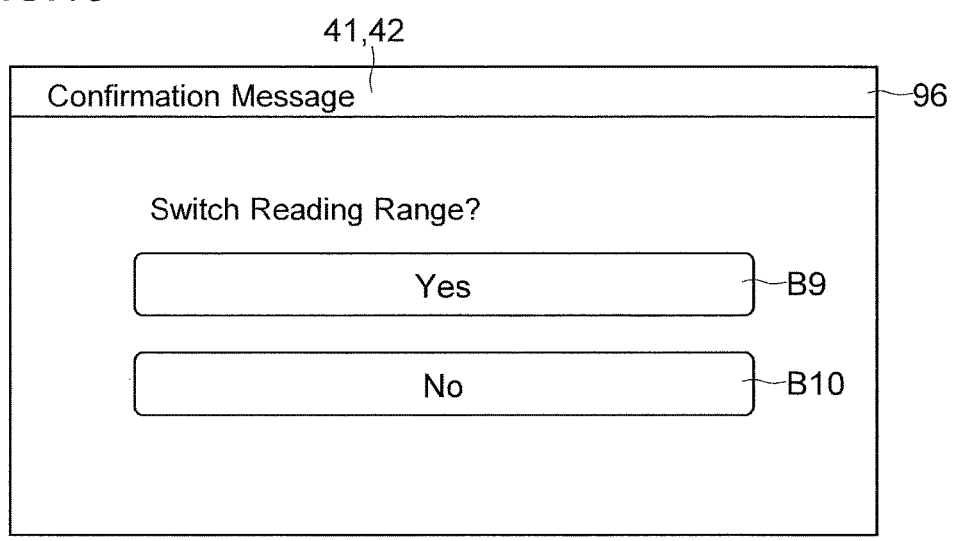
FIG. 16 is a diagram showing an example of a confirmation message screen according to the embodiment.

After completion of reading of the set number of sheets to be read 83, the controller 1 can make the display panel 41 display a confirmation message asking whether or not to change the reading range 8. FIG. 16 shows an example of a confirmation message screen 96. The confirmation message screen 96 is provided with a Yes button B9 and a No button B10. When wanting to switch the reading range 8 to the next one in order, a user operates the Yes button B9. On the other hand, the user may make a mistake in setting the number of sheets to be read 83. When not wanting to change the reading range 8, a user operates the No button B10. Thus, even if the number of sheets to be read 83 is set too small, it is possible to continue reading of the next document without changing the reading range 8. In a case where the confirmation message is displayed, when the operation panel 4 accepts operation of the Yes button B9, the reading controller 20 determines to switch the reading range 8. That is, after the confirmation message is displayed, when the operation panel 4 accepts an instruction to change the reading range 8, the reading controller 20 changes the reading range 8. When the operation panel 4 accepts operation of the No button B10, the reading controller 20 determines not to switch the reading range 8.

When the reading controller 20 determines not to switch the reading range 8 (Step #34, No), the reading controller 20 moves the carriage 6 (Step #35). In the speed priority mode, after completion of reading of a document, the reading controller 20 moves the carriage 6 such that the position of the reading line is at the start position 81 of the current reading range 8. In the image quality priority mode, the reading controller 20 returns the carriage 6 to the home position.

Next, the controller 1 determines whether or not reading is completed (Step #36); specially, it checks whether or not the operation panel 4 has accepted operation of the reading completion button B1. When the operation panel 4 accepts operation of the reading completion button B1, the controller 1 determines that reading is completed. When the controller 1 determines that reading is completed (Step #36, Yes), the procedure ends (END). After completion of the procedure, the controller 1 performs a print or transmission job based on image data acquired by reading. In the speed priority mode, the reading controller 20 makes the scanning motor 24*d* operate and returns the carriage 6 to the home position.

When not the reading completion button B1 but the reading start button B2 is operated (Step #36, No), in reading in the same reading range 8, the reading controller 20 makes the carriage 6 read the second and subsequent sheets of the document only in the set reading range 8 (Step #37). In the speed priority mode, the reading controller 20 moves the position of the reading line from the start position 81 to the end position 82, and thereby the reading controller 20 makes the image sensor 62 read only in the reading range 8. In the image quality mode, the reading controller 20 makes the image sensor 62 acquire black reference values and white reference values. Then, the reading controller 20 makes the scanning motor 24*d* operate. The reading controller 20 moves the position of the reading line from a position where the white reference plate 23 is read (home position) to the end position 82, and thereby the reading controller 20 makes the image sensor 62 read only in the reading range 8.

The controller 1 (image processing circuit 12) generates image data of the second and subsequent sheets of the document in the current reading range 8 based on the result of reading (Step #38). The controller 1 uses image data of the whole first sheet of the document in the same reading range as the current reading range 8. First, the controller 1 (image processing circuit 12) copies the whole image data acquired by reading the first sheet of the document. Then, the controller 1 (image processing circuit 12) embeds, in the copied image data, the image data acquired by reading only in the current reading range 8. The controller 1 (image processing circuit 12) overwrites the image data in a belt-shaped part, from the start position 81 to the end position 82, of the copied image data with the image data acquired by reading only in the reading range 8. Accordingly, even if image data is read only in the reading range 8, it is possible to acquire the whole-page image data of the second and subsequent sheets of the document in the current reading range 8. Then, the procedure returns to Step #34.

On the other hand, when the reading controller 20 determines to switch the reading range 8 (Step #34, No), the controller 1 determines whether or not reading is completed (Step #39); specially, it checks whether or not the operation panel 4 has accepted operation of the reading completion button B1. When the operation panel 4 accepts operation of the reading completion button B1, the controller 1 determines that reading is completed. When the controller 1 determines that reading is completed (Step #39, Yes), the procedure ends (END). In the speed priority mode, the reading controller 20 makes the scanning motor 24*d* operate and returns the carriage 6 to the home position.

When not the reading completion button B1 but the reading start button B2 is operated (Step #39, No), the reading controller 20 checks whether or not a document to be read in the next reading range 8 in order is the first sheet of the document (Step #310); then, if it is the first sheet of the document (Step #310, Yes), to read the whole document, the reading controller 20 moves the carriage 6 to the home position (Step #311). After Step #311, the procedure returns to Step #33.

The same reading range 8 may be set in different position in order in the order setting screen 94. After the reading range 8 has been switched once, when a setting to use the same reading range 8 again is made, Step #310 may return No. When a document to be read in the next reading range 8 in order is not the first sheet of the document (Step #310, No), the reading controller 20 moves the carriage 6 according to the mode (Step #312). In the speed priority mode, the reading controller 20 moves the carriage 6 such that the position of the reading line is at the start position 81 of the switched reading range 8. In the image quality priority mode, the reading controller 20 returns the carriage 6 to the home position.

Then, the reading controller 20 makes the carriage 6 read the second and subsequent sheets of the document in the same reading range 8 only in the set reading range 8 (Step #313). In the speed priority mode, the reading controller 20 moves the position of the reading line from the start position 81 to the end position 82, and thereby the reading controller 20 makes the image sensor 62 read only in the reading range 8. In the image quality priority mode, the reading controller 20 makes the image sensor 62 acquire black reference values and white reference values. Then, the reading controller 20 makes the scanning motor 24*d* operate. The reading controller 20 moves the position of the reading line from a position where the white reference plate 23 is read (home position) to the end position 82, and thereby the reading controller 20 makes the image sensor 62 read only in the reading range 8.

Then, the controller 1 (image processing circuit 12) generates image data of the document based on the result of reading (Step #314). The controller 1 uses image data of the whole first sheet of the document read under the current (switched) setting of the reading range 8. First, the controller 1 (image processing circuit 12) copies the whole image data of the first sheet of the document read previously under the current setting of the reading range 8. Then, the controller 1 (image processing circuit 12) embeds, in the copied image data, the image data acquired by reading only in the current reading range 8. The controller 1 (image processing circuit 12) overwrites the image data in a belt-shaped part, from the start position 81 to the end position 82, of the copied image data with the image data acquired by reading only in the reading range 8. Accordingly, even if image data is read only in the reading range 8, it is possible to acquire the whole-page image data of the second and subsequent sheets of the document in the current reading range 8. Then, the procedure returns to Step #34.

As described above, the image reading apparatus according to the embodiment includes a contact glass 21, a carriage 6, an image sensor 62, an image data generating unit 7, a moving mechanism 24, an operation panel 4, and a reading controller 20 (a first controller). On the contact glass 21, a document is placed. The carriage 6 has a home position set for it, and includes a lamp 61 irradiating a document with light. The image sensor 62 receives the reflected light from a document to read the document. The image data generating unit 7 generates image data based on the output of the image sensor 62. The moving mechanism 24 moves the carriage 6 in the sub-scanning direction at one side of the contact glass 21. The operation panel 4 accepts a setting for using a continuous reading mode and settings for a start position 81 and an end position 82 of a reading range 8. The reading controller 20 controls the moving mechanism 24. The continuous reading mode is a mode in which, until the operation panel 4 accepts completion of reading, reading of the document placed on the contact glass 21 is continued, and a job is started after completion of reading is accepted. The home position is provided outside the contact glass 21 in the sub-scanning direction. In a case where the continuous reading mode is set, and in addition the reading range 8 is set, when the reading controller 20 reads a plurality of documents in the set reading range 8, in the reading of the second and subsequent sheets of the document in the set reading range 8, the reading controller 20 does not move the position of the reading line of the image sensor 62 to outside the end position 82 as seen from the home position.

The reading controller 20 does not always move the carriage 6 (the position of the reading line) up to the farther end of the document as seen from the home position. In this way, when a plurality of sheets of a document are read in the same reading range 8, the movement distance of the carriage 6 can be shortened; it is thus possible to make the movement time of the carriage 6 required in reading of a sheet of a document shorter than ever. Thus, the time taken to enter a state where the reading of the next document can be started can be reduced. Accordingly, it is possible to shorten the time required in reading of a document.

The operation panel 4 accepts the choice of the speed priority mode as one of the different modes of the continuous reading mode. In a case where the speed priority mode is set, when a plurality of sheets of a document are read in the set reading range 8, in the reading of the second and subsequent sheets of the document in the set reading range 8, the reading controller 20 aligns the position of the reading line with the start position 81 after reading of the previous document. The reading controller 20 moves the position of the reading line from the start position 81 to the end position 82, and thereby the reading controller 20 makes the image sensor 62 read only in the reading range 8. In a case where the speed priority mode is set, when a document is read, the carriage 6 (the position of the reading line) reciprocates only between the start position 81 and the end position 82. In this way, it is possible to make the movement distance of the carriage 6 required in reading of a sheet of a document far shorter than ever. Thus, the time taken to enter a state where the reading of the next document can be started can be reduced. Accordingly, it is possible to shorten the time required in reading of a document.

The multifunction peripheral 100 (image reading apparatus) includes a white reference plate 23 which is arranged outside the contact glass 21 in the sub-scanning direction and from which to acquire white reference values. The image data generating unit 7 performs shading correction based on the black reference value and the white reference value acquired by reading the white reference plate 23. The operation panel 4 accepts the choice of the image quality priority mode as one of the different modes of the continuous reading mode. In a case where the image quality priority mode is set, the reading controller 20 returns the position of the reading line to a position where the white reference plate 23 is read after reading of the previous document. Each time a document is read, the reading controller 20 updates black reference values. Each time a document is read, the reading controller 20 makes the image sensor 62 read the white reference plate 23 and updates white reference values. In the reading of the second and subsequent sheets of the document in the set reading range 8, the reading controller 20 moves the position of the reading line from the position where the white reference plate 23 is read to the end position 82, and thereby the reading controller 20 makes the image sensor 62 read only in the reading range 8. In a case where the image quality priority mode is set, when a document is read, the carriage 6 (the position of the reading line) reciprocates only between the position where the white reference plate 23 is read and the end position 82. Thus, it is possible to make the movement distance of the carriage 6 required in reading of a sheet of a document shorter than ever. Furthermore, each time a document is read, black reference values and white reference values are updated; thus, image quality can be maintained. In this way, it is possible to make the time taken to enter a state where the reading of the next document can be started shorter than ever. Accordingly, it is possible, while maintaining image quality, to shorten the time required in reading of a document.

When a plurality of sheets of a document are read in the set reading range 8, in the reading of the first sheet of the document in the set reading range 8, the reading controller 20 moves the position of the reading line from the home position to the rear end of the first sheet of the document, and thereby the reading controller 20 makes the image sensor 62 read the whole document. The controller 1 (a second controller, image processing circuit 12) copies the image data acquired by reading the first sheet of the document in the reading of the second and subsequent sheets of the document in the set reading range 8. Then, the controller 1 (image processing circuit 12) embeds, in the copied image data, the image data acquired by reading only in the reading range 8, and thereby the controller 1 generates image data of the second and subsequent sheets of each document. In this way, even if image data is read only in the reading range 8, it is possible to acquire the whole-page image data. When sheets on which only part of a document is different, such as answered survey forms, are read continuously, it is possible to acquire image data of the same content as the document.

The controller 1 controls display on the display panel 41. The controller 1 checks whether or not the start position 81 of the set reading range 8 is located outside the center of the document in the sub-scanning direction as seen from the home position. When the start position 81 of the set reading range 8 is located outside the center of the document in the sub-scanning direction as seen from the home position, the controller 1 makes the display panel 41 display a message that the document has to be turned by 180 degrees. Thus, the reading range 8 can be set so as to be closer to the home position of the carriage 6. The reading range 8 is set such that the movement distance of the carriage 6 is shortened. In this way, the reading range 8 can be set such that the time required in reading of a document is shortened.

The operation panel 4 accepts setting of a plurality of kinds of reading range 8. The operation panel 4 accepts setting of the number of sheets to be read 83 in each reading range 8. Each time the set number of sheets to be read 83 is read, the reading controller 20 changes the reading range 8. When the first sheet of the document is read in the changed reading range 8, the reading controller 20 returns the carriage 6 to the home position. It is possible, while changing the reading range 8, to promptly read the document continuously. Even if the reading range 8 differs from one document to another, it is possible to continue to read in the continuous reading mode. It is possible to previously set the number of sheets to be read 83 in each reading range 8.

The controller 1 controls display on the display panel 41. When the set number of sheets to be read 83 have been read, the controller 1 makes the display panel 41 display a confirmation message asking whether or not to change the reading range 8. After the confirmation message is displayed, when the operation panel 4 accepts an instruction to change the reading range 8, the reading controller 20 changes the reading range 8. In this way, the reading range 8 is changed after receiving a user's confirmation; thus, it is possible to prevent a change of the reading range 8 unintended by a user.

The operation panel 4 accepts setting of the using order of a plurality of kinds of set reading range. The reading controller 20 changes the reading range according to the set using order. A user can set the using order of the set reading ranges. A user can freely determine the order in which to use the set reading ranges.

The operation panel 4 accepts setting of the number of sheets to be read in each reading range of which the using order is set. Each time the set number of sheets to be read is read, the reading controller 20 changes the reading range according to the set using order. It is possible to set the number of sheets to be read in each reading range of which the using order is set. It is possible to automatically change the reading range according to the order and number of documents.

The operation panel 4 accepts a test scanning operation to check whether or not the set reading range is appropriate. When the test scanning operation is made (the test scanning button B3 is operated), the reading controller 20 moves the carriage 6 and makes it read the document only in the set reading range 8. The controller 1 makes the display panel 41 display the preview image i1 showing the result of reading only in the set reading range 8. In this way, it is possible to check whether or not the set reading range is appropriate.

It should be understood that the embodiments of the present disclosure described above are in no way meant to limit its scope; the present disclosure can be implemented with any modifications made without departing from its spirit.

The embodiments of the present disclosure described above deal with an example where, in the speed priority mode, after completion of reading of a document, the reading controller 20 moves the carriage 6 such that the position of the reading line is at the start position 81 of the set reading range 8. However, in the speed priority mode, after completion of reading of a document, the reading controller 20 may move the carriage 6 to a position where the position of the reading line is closer to the home position than the start position 81 of the set reading range 8 by the distance required for acceleration. The distance required for acceleration is the movement distance of the carriage 6 required to accelerate the carriage 6 from a resting state (with a zero speed) to a steady moving speed. The steady moving speed is a predetermined speed. The steady moving speed is a speed at which the carriage 6 moves one line during the period for reading one line.

What is claimed is:
1. An image reading apparatus comprising:
a contact glass on which a document is placed;
a carriage of which a home position is set, the carriage including a lamp irradiating a document with light;
a sensor receiving reflected light from a document to read the document;
an image data generating unit generating image data based on an output of the sensor;
a moving mechanism moving the carriage in a sub-scanning direction at one side of the contact glass;
an operation panel accepting a setting for using a continuous reading mode and settings for a start position and an end position of a reading range; and
a first controller controlling the moving mechanism;
wherein
the continuous reading mode is a mode in which, until the operation panel accepts completion of reading, reading of the document placed on the contact glass is continued, and a job is started after the completion of reading is accepted,
the home position is provided outside the contact glass in the sub-scanning direction, and
in a case where the continuous reading mode is set, and in addition the reading range is set,
the first controller, when a plurality of sheets of a document are read in the set reading range, in reading of second and subsequent sheets of the document in the set reading range, does not move the position of the reading line of the sensor to outside the end position in the sub-scanning direction as seen from the home position.

2. The image reading apparatus according to claim 1, wherein the operation panel accepts choice of a speed priority mode as one of different modes of the continuous reading mode, and in a case where the speed priority mode is set, the first controller, when a plurality of sheets of a document are read in the set reading range, in reading of the second and subsequent sheets of the document in the set reading range, aligns the position of the reading line with the start position after reading of the previous document, and moves the position of the reading line from the start position to the end position, and thereby the first controller makes the sensor read only in the reading range.

3. The image reading apparatus according to claim 1, further comprising:

a white reference plate arranged outside the contact glass in the sub-scanning direction, the white reference plate being for acquiring a white reference value therefrom; wherein the image data generating unit performs shading correction based on a black reference value and the white reference value acquired by reading the white reference plate, the operation panel accepts choice of an image quality priority mode as one of different modes of the continuous reading mode, and in a case where the image quality priority mode is set, the first controller returns the position of the reading line to a position where the white reference plate is read after reading of the previous document, updates the black reference value each time a document is read, makes the sensor read the updates the white reference plate and updates the white reference value each time a document is read, and in reading of the second and subsequent sheets of the document in the set reading range, moves the position of the reading line from a position where the white reference plate is read to the end position, and thereby the first controller makes the sensor read only in the reading range.

4. The image reading apparatus according to claim 1, further comprising:

a second controller;

wherein when a plurality of sheets of a document are read in the set reading range, the first controller, in reading of a first sheet of the document in the set reading range, moves the position of the reading line from the home position to a rear end of the first sheet of the document, and thereby the first controller makes the sensor read a whole document, and the second controller, in reading of the second and subsequent sheets of the documents in the set reading range, copies the image data acquired by reading the first sheet of the document, and embeds, in the copied image data, the image data acquired by reading only in the reading range, and thereby the second controller generates image data of the second and subsequent sheets of each document.

5. The image reading apparatus according to claim 1, further comprising:

a display panel performing display; and a second controller controlling display on the display panel;

wherein the second controller checks whether or not the start position of the set reading range is located outside a center of the document in the sub-scanning direction as seen from the home position, and when the start position of the set reading range is located outside the center of the document in the sub-scanning direction as seen from the home position, makes the display panel display a message that the document has to be turned by 180 degrees.

6. The image reading apparatus according to claim 1, wherein the operation panel accepts setting of a plurality of kinds of reading range, and accepts setting of the number of sheets to be read in each reading range, and the first controller changes the reading range each time the set number of sheets to be read is read, and when the first sheet of the document is read in the changed reading range, returns the carriage to the home position.

7. The image reading apparatus according to claim 6, wherein the operation panel accepts setting of the using order of a plurality of kinds of set reading range, and the first controller changes the reading range according to the set using order.

8. The image reading apparatus according to claim 7, wherein the operation panel accepts setting of the number of sheets to be read in each reading range of which the using order is set, and the first controller changes the reading range according to the set using order each time the set number of sheets to be read is read.

9. The image reading apparatus according to claim 1, further comprising:

a display panel performing display; and a second controller controlling display on the display panel;

wherein the operation panel accepts a test scanning operation to check whether or not the set reading range is appropriate, when the test scanning operation is made, the first controller moves the carriage and makes the carriage read the document only in the set reading range, and the second controller makes the display panel display a preview image showing a result of reading only in the set reading range.

10. The image reading apparatus according to claim 1, further comprising:

a display panel performing display; and a second controller controlling display on the display panel;

wherein when the set number of sheets to be read is read, the second controller makes the display panel display a confirmation message asking whether or not to change the reading range, and after the confirmation message is displayed, when the operation panel accepts an instruction to change the reading range, the first controller changes the reading range.

11. A method for controlling an image reading apparatus, comprising:

setting a home position of a carriage;

irradiating a document placed on a contact glass with light;

reading a document by a sensor receiving a reflected light from a document;

generating image data based on an output of the sensor;

moving the carriage in a sub-scanning direction at one side of the contact glass;

accepting a setting for using a continuous reading mode and settings for a start position and an end position of a reading range;

in the continuous reading mode, continuing to read a document placed on the contact glass until the operation panel accepts completion of reading;

in the continuous reading mode, starting a job after the completion of reading is accepted;

providing the home position outside the contact glass in the sub-scanning direction; and in a case where the continuous reading mode is set, and in addition the reading range is set, when a plurality of sheets of a document are read in the reading range, in reading of second and subsequent sheets of the documents in the set reading range, not moving the position of the reading line of the sensor to outside the end position in the sub-scanning direction as seen from the home position.

* * * * *